United States Patent
Allman et al.

(10) Patent No.: US 8,322,378 B2
(45) Date of Patent: Dec. 4, 2012

(54) I-BEAM CHECK VALVE

(75) Inventors: James H. Allman, Chelmsford (CA); Eric J. R. Faucon, Sudbury (CA)

(73) Assignee: Elasto-Valve Rubber Products, Inc., Sudbury (CA)

( * ) Notice: Subject to any disclaimer, the term of this patent is extended or adjusted under 35 U.S.C. 154(b) by 207 days.

(21) Appl. No.: 12/897,025

(22) Filed: Oct. 4, 2010

(65) Prior Publication Data

US 2011/0100496 A1 May 5, 2011

(30) Foreign Application Priority Data

Nov. 2, 2009 (CA) .................................. 2684248

(51) Int. Cl.
*F16K 15/14* (2006.01)
(52) U.S. Cl. ........................ 137/849; 137/846
(58) Field of Classification Search .............. 137/849, 137/846
See application file for complete search history.

(56) References Cited

U.S. PATENT DOCUMENTS

| | | | |
|---|---|---|---|
| 168,775 | A | 10/1875 | Painter |
| 1,923,501 | A | 8/1933 | Perry |
| 2,594,318 | A | 4/1952 | Langdon |
| 3,118,468 | A | 1/1964 | Bochan |
| 4,492,253 | A | 1/1985 | Raftis |
| 5,727,593 | A | 3/1998 | Duer |
| 6,367,505 | B1 | 4/2002 | Raftis et al. |
| 6,382,255 | B2 * | 5/2002 | McFarland ............ 137/849 |
| 6,702,255 | B2 | 3/2004 | Dehdashtian |
| 7,243,681 | B2 | 7/2007 | Dahm |
| 7,530,369 | B2 | 5/2009 | Anderson |
| 7,533,696 | B2 | 5/2009 | Paul, Jr. |
| 2005/0027261 | A1 | 2/2005 | Weaver et al. |
| 2006/0118189 | A1 | 6/2006 | Tekulve et al. |
| 2008/0160371 | A1 | 7/2008 | Spahr et al. |

FOREIGN PATENT DOCUMENTS

| | | |
|---|---|---|
| CA | 1209012 | 8/1986 |
| JP | 57-179479 | 11/1982 |

OTHER PUBLICATIONS

Patent Abstracts of Japan, Abstract of JP57-179479.

* cited by examiner

*Primary Examiner* — Kevin Lee
*Assistant Examiner* — Macade Brown
(74) *Attorney, Agent, or Firm* — Marshall & Melhorn LLC

(57) ABSTRACT

A check valve for one-way flow of a fluid comprises a valve body defining at least two pairs of axially-extending sidewalls, each pair of sidewalls having a pair of resilient lips defining slit opening at the outlet end of the valve. In one embodiment of the invention, the valve body defines three pairs of sidewalls and corresponding lips which are arranged one another so as to provide the check valve with an "I-beam" cross-sectional shape. The I-beam check valve has a compact cross-section, making it suitable for mounting either inside or outside a pipe. The I-beam shape provides support along the valve axis so that the valve does not require any supplemental support structure. In another embodiment, the valve body may define two pairs of sidewalls having a "T-shaped" transverse cross section.

18 Claims, 13 Drawing Sheets

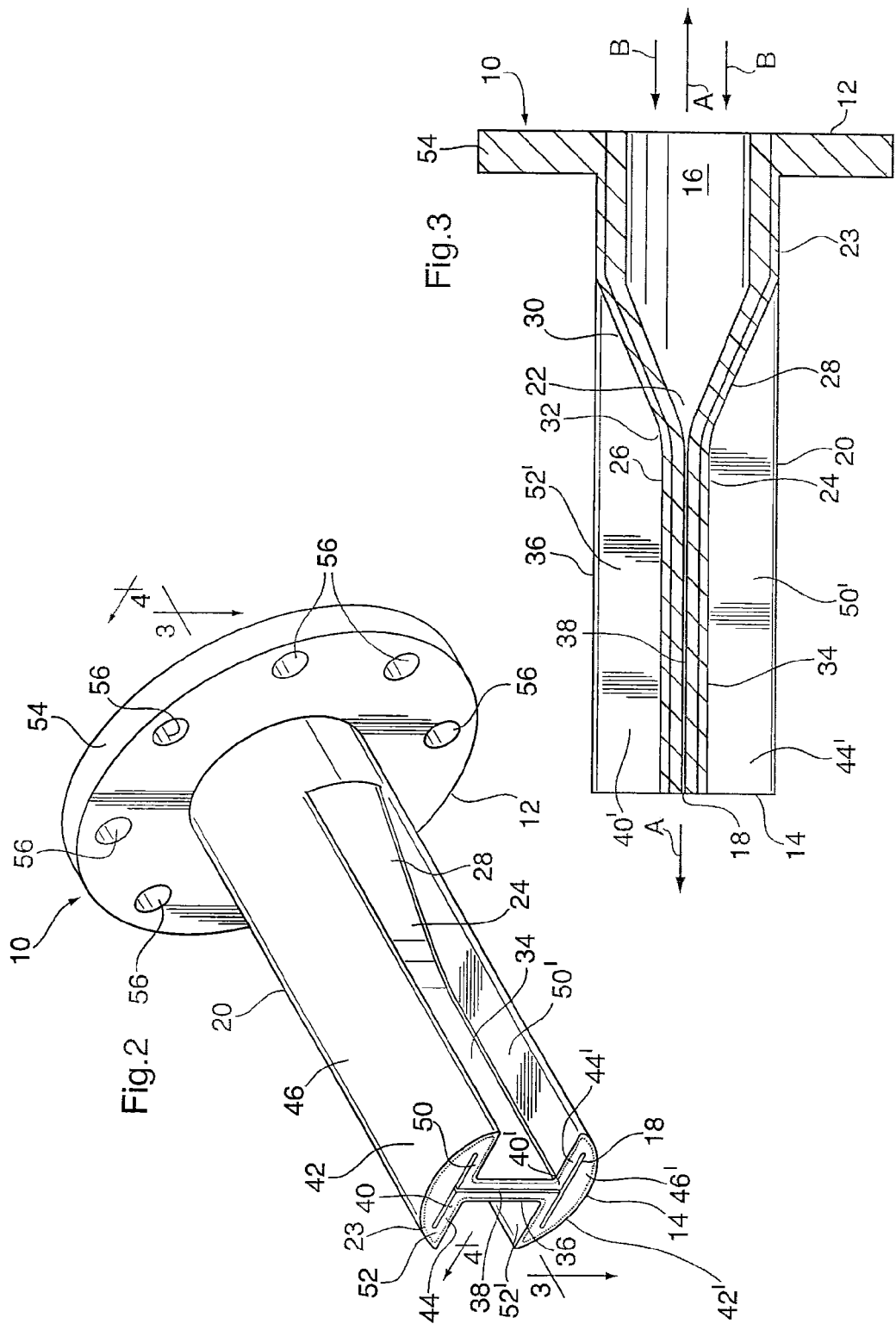

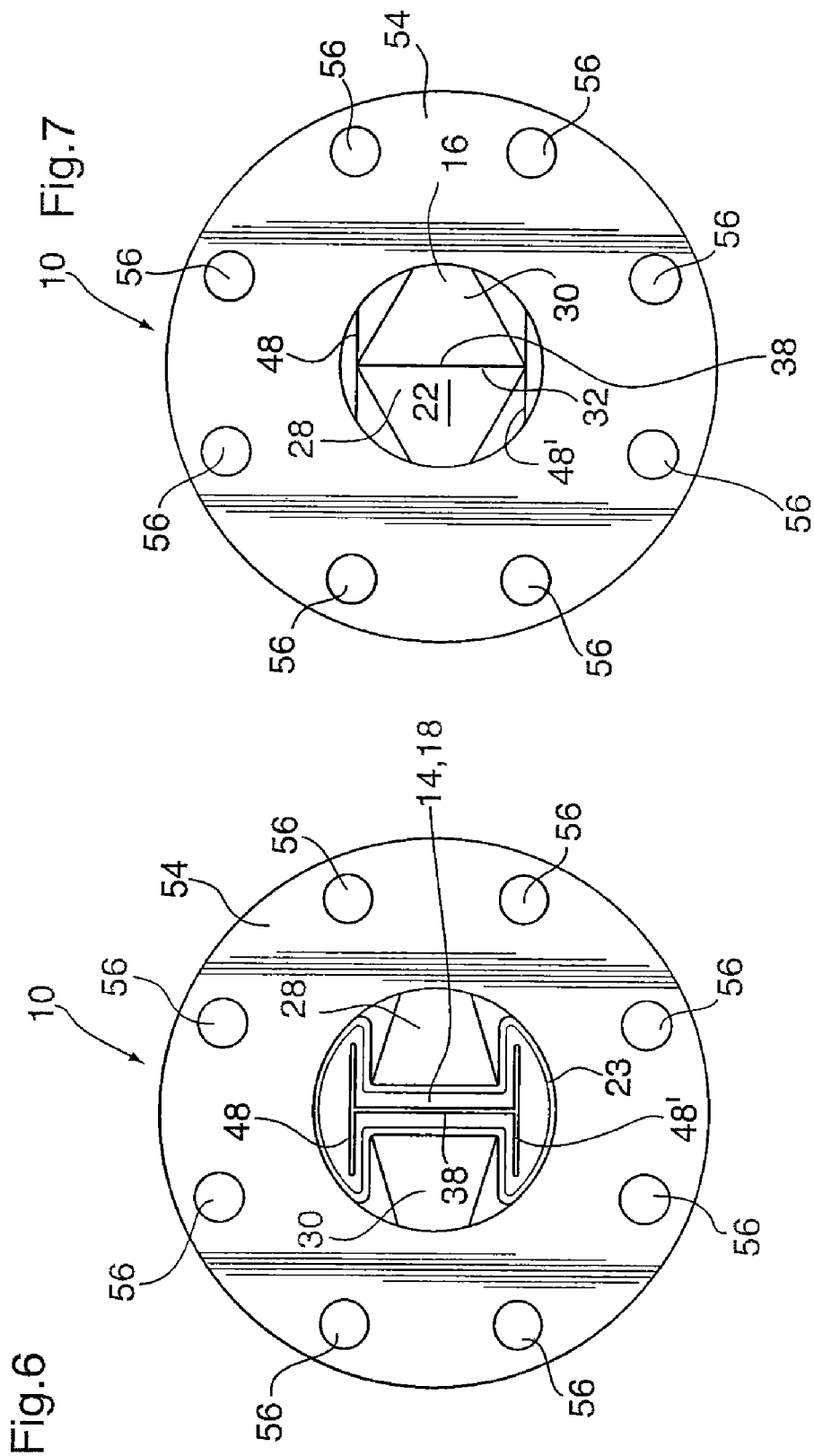

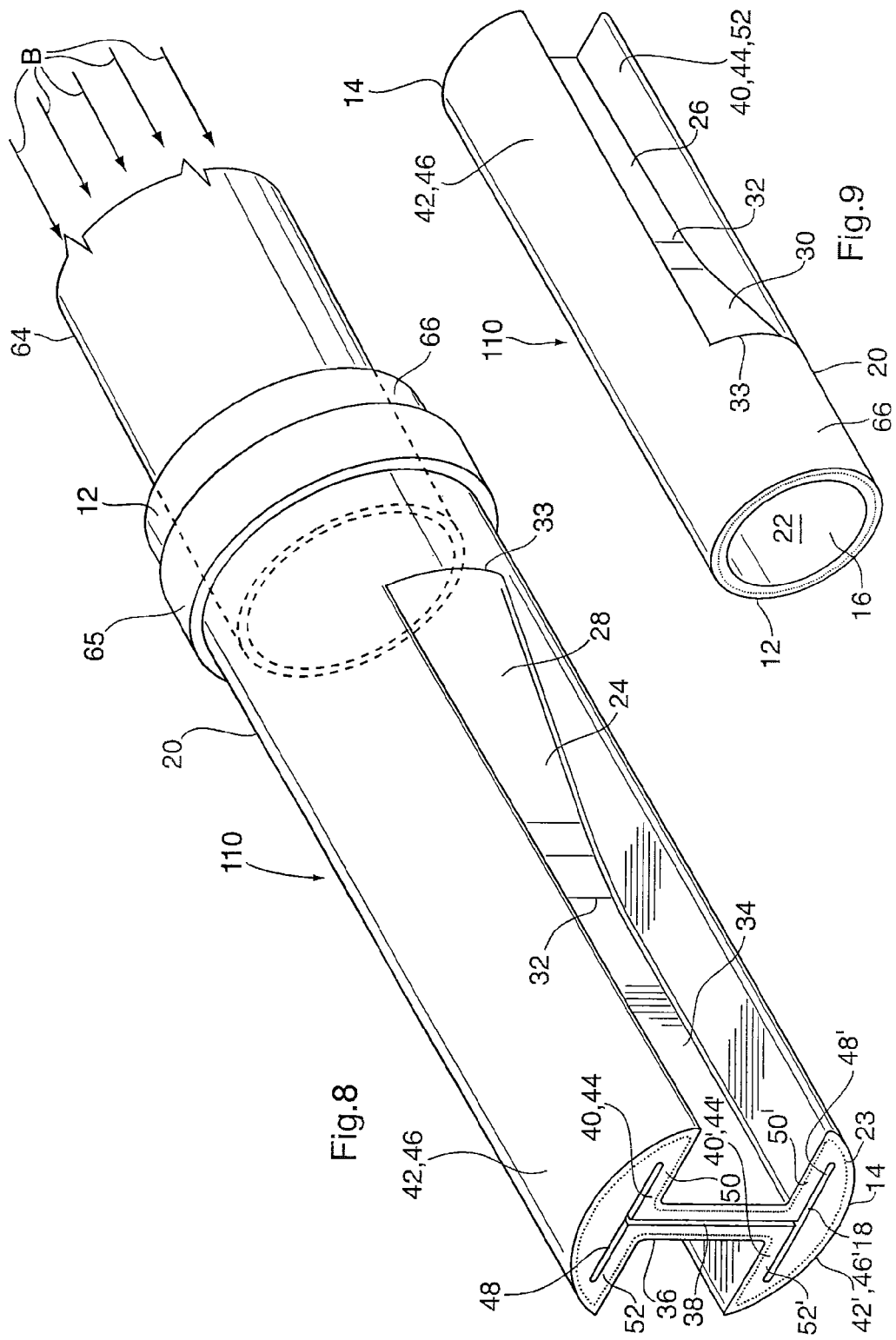

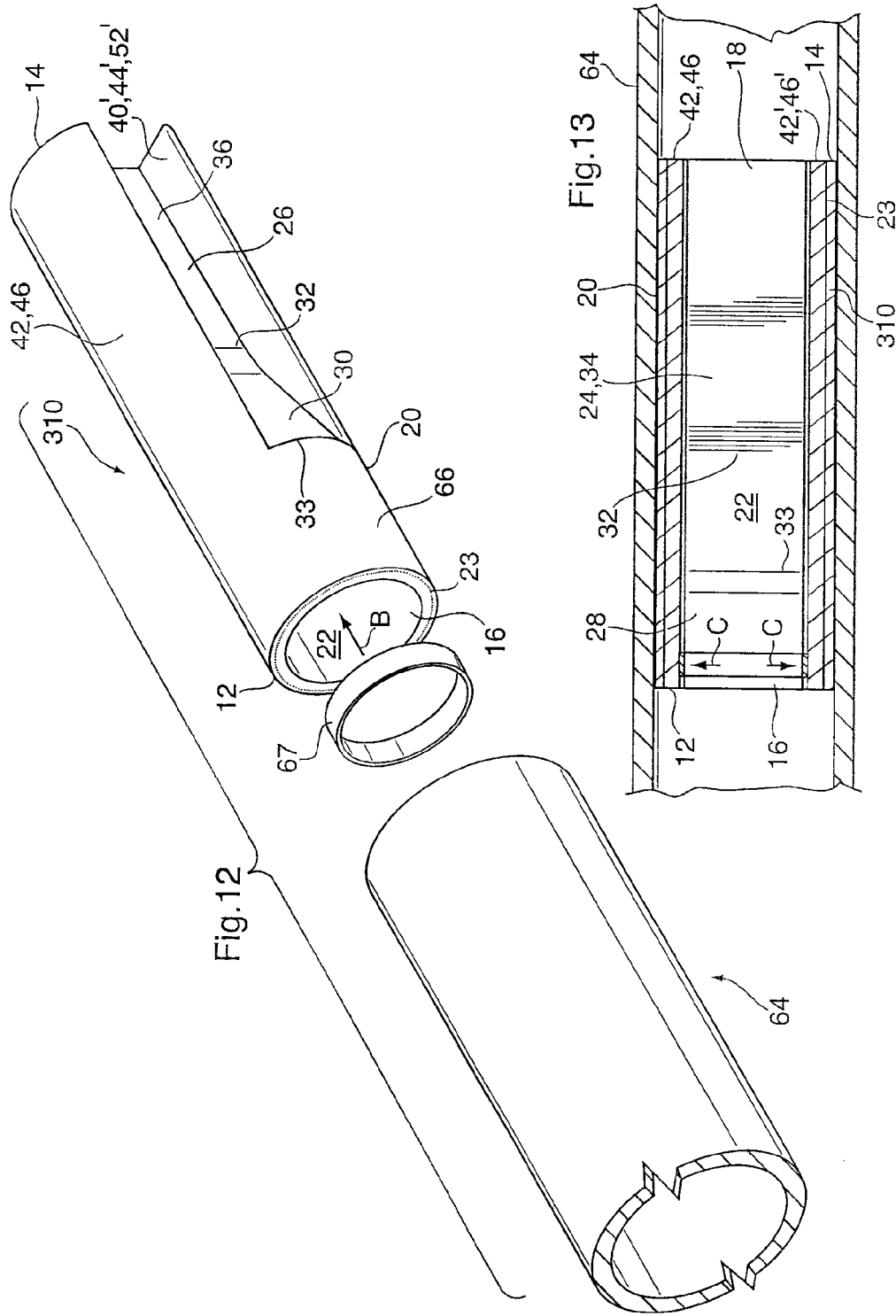

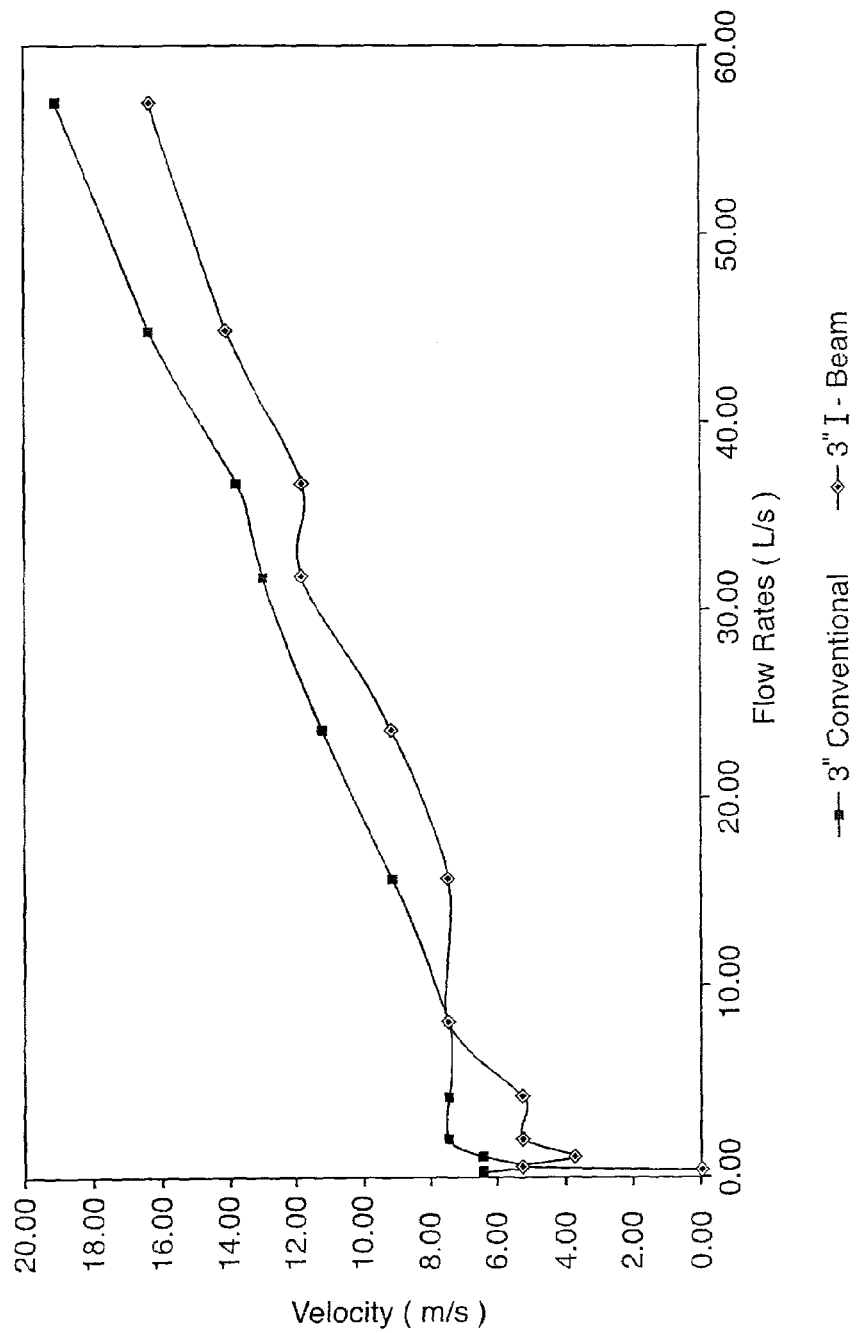

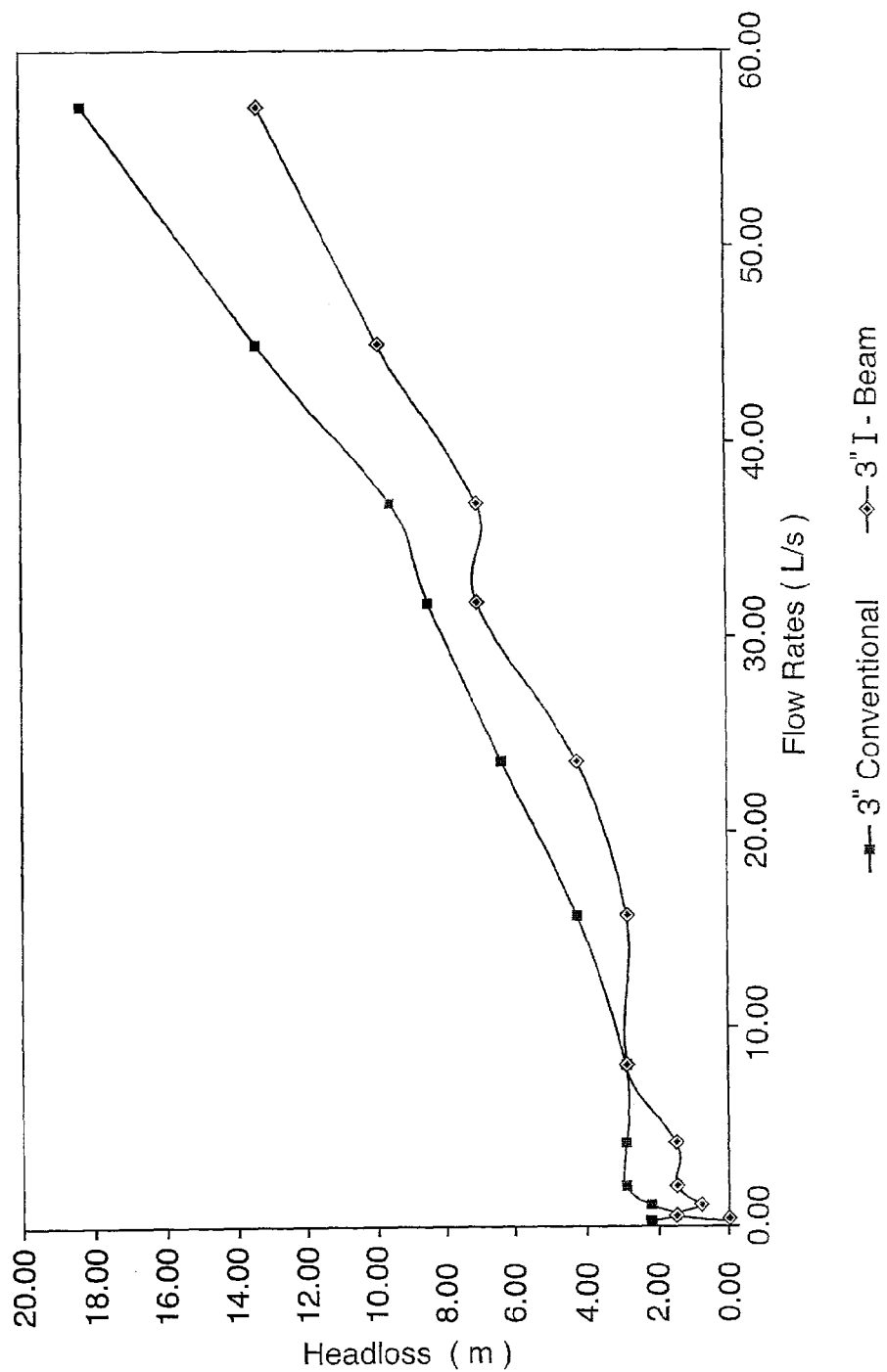

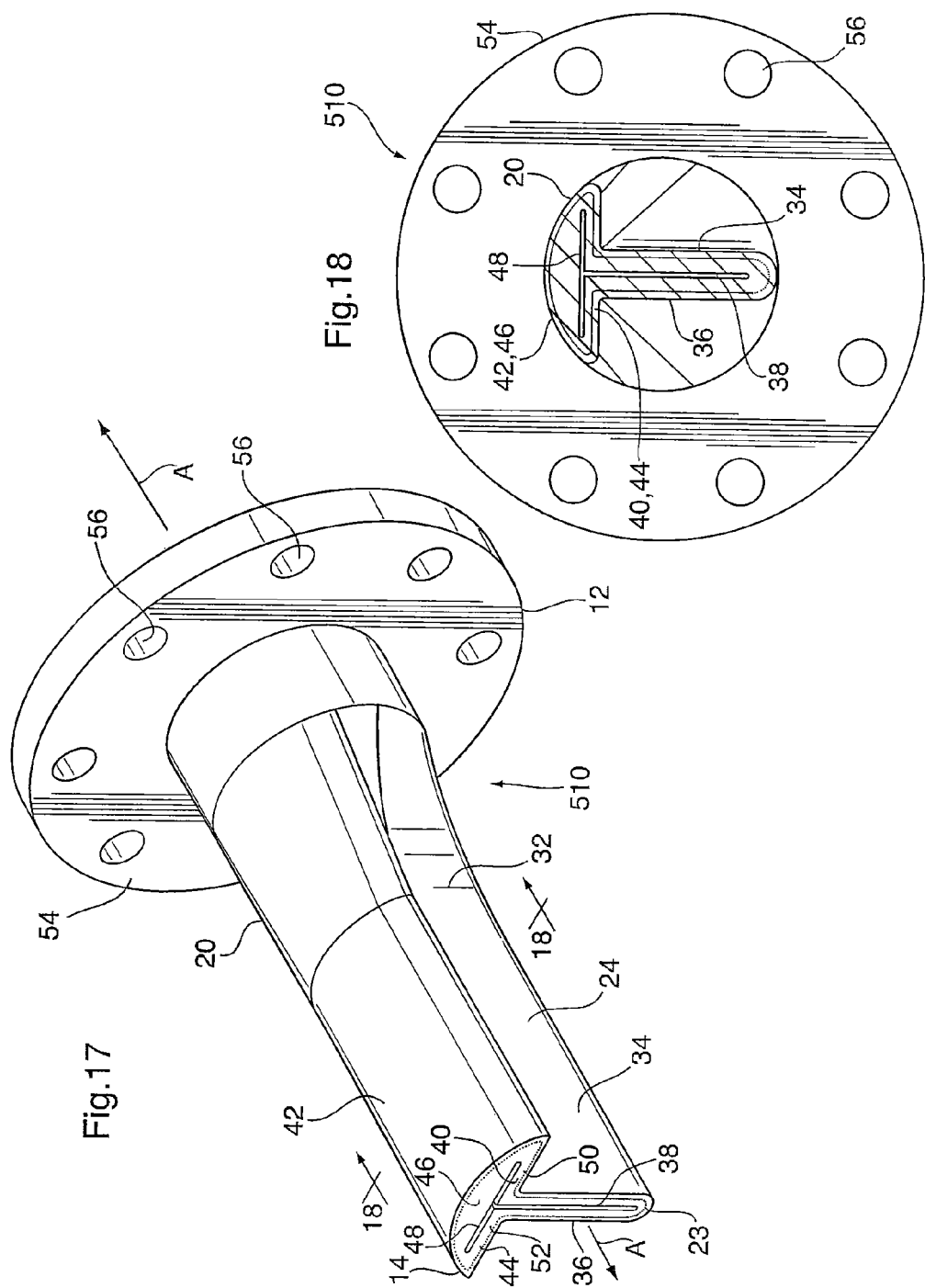

I-BEAM CHECK VALVE

FIELD OF THE INVENTION

The invention relates to one-way elastomeric check valves for controlling flow of fluids through conduits such as pipes.

BACKGROUND OF THE INVENTION

Elastomeric check valves are used to control fluid flow in a variety of applications. Such check valves are typically mounted either on or in the end of a conduit such as a pipe, and are designed to permit flow through the pipe in one direction only, and to seal shut to prevent back flow in the conduit.

Elastomeric check valves typically have what is commonly referred to in the art as a "duckbill" appearance, having a pair of opposed sidewalls which converge toward one another and terminate in a pair of resilient lips which define a slit opening at the outlet end of the valve. Check valves must be sufficiently rigid to resist collapse, also known as "inversion", for example when the valve is acted on by a back pressure, yet the lips must be flexible enough to open under relatively low inlet fluid pressures so as to minimize the pressure drop, or headloss, across the valve. Furthermore, the length of the slit opening at the end of the valve must be sufficiently large so as to minimize the headloss.

A number of check valve designs have been proposed in the prior art to deal with these concerns. Some prior art valves have enlarged bills with slit lengths greater than the valve diameter in order to minimize headloss. However, such valves generally cannot be installed inside pipes, and have limited application where ground clearance is limited. Furthermore, valves with enlarged bills are prone to sagging and drooping, resulting in poor closure and leaking. The issue of sagging has been addressed in the prior art by providing curved bills, while inversion has been addressed by providing the valve body with secondary reinforcement which helps the valve to maintain its shape under back pressure. None of the solutions proposed to date have been entirely successful in addressing the issues of headloss and inversion resistance over the range of applications in which check valves are typically used. As a result, there are a relatively large number of valve designs on the market, each of which is suitable for a relatively narrow range of applications.

Therefore, there is an unsatisfied need for a check valve which provides relatively low headloss and high inversion resistance, and which can be used in a wide variety of applications.

SUMMARY OF THE INVENTION

In one aspect, the invention provides a check valve for one-way flow of a fluid, comprising: (a) a proximal end having an inlet opening through which the fluid enters the valve; (b) a distal end having an outlet opening through which the fluid is discharged from the valve when the valve is open, wherein the proximal and distal ends are spaced apart from one another along a central axis of the valve; (c) a valve body formed of a resilient material and extending from the proximal end to the distal end of the valve, wherein the valve body encloses a fluid flow passage extending between the inlet and outlet openings, and wherein the valve body defines three pairs of axially-extending sidewalls; (d) a first pair of the sidewalls arranged in opposed facing relation to one another and defining a first pair of resilient lips which are in sealing contact with one another when the valve is closed, with a first slit opening being formed between the first pair of lips, wherein the first slit opening comprises part of the outlet opening; (e) a second pair of the sidewalls arranged in opposed facing relation to one another and defining a second pair of resilient lips which are in sealing contact with one another when the valve is closed, with a second slit opening being formed between the second pair of lips, wherein the second slit opening comprises part of the outlet opening; (f) a third pair of the sidewalls arranged in opposed facing relation to one another and defining a third pair of resilient lips which are in sealing contact with one another when the valve is closed, with a second slit opening being formed between the second pair of lips, wherein the second slit opening comprises part of the outlet opening; wherein the second pair of lips is joined to the first pair of lips at an angle, and the first and second slit openings intersect one another at an angle; and wherein the third pair of lips is joined to the first pair of lips at and angle, and the first and third slit openings intersect one another at an angle.

In another aspect, the angle between the first and second pair of lips is about 90 degrees, and the angle between the first and third pair of lips is about 90 degrees.

In another aspect, the first slit opening has a pair of opposed ends, and wherein the ends of the first slit opening intersect the second and third slit opening approximately midway between their ends, such that the outlet opening defined by the first, second and third slit openings has an I-beam cross-sectional shape.

In another aspect, the first, second and third slit openings have a combined length which is greater than an inside diameter of the valve body at the proximal end of the valve.

In another aspect, the first, second and third slit openings have a combined length which is equal to or greater than an inside circumference of the valve body at the proximal end of the valve.

In another aspect, the first pair of sidewalls include inwardly converging portions which converge radially inwardly toward the central axis and axially toward the distal end of the valve, and wherein the converging portions come together at a point of convergence located between the proximal and distal ends of the valve.

In another aspect, the first pair of lips and the first slit opening extend along the central axis from the point of convergence to the distal end of the valve.

In another aspect, the second and third pairs of lips and the second and third slit openings extend parallel to the central axis from the point of convergence to the distal end of the valve.

In another aspect, the first pair of sidewalls comprises a pair of duckbill sidewalls.

In another aspect, the first pair of lips are arranged symmetrically about the central axis, and the first and second pairs of lips are offset from the central axis.

In another aspect, the second and third pairs of lips are arranged parallel to one another and symmetrically about the central axis, with the first pair of lips extending lengthwise between the second and third pairs of lips.

In another aspect, the second and third pairs of walls each include an inner sidewall and an outer sidewall. The outer sidewall may have an outer surface located at an outer periphery of the valve body and may extend parallel to the central axis from the proximal end to the distal end of the valve.

In another aspect, the first, second and third pairs of lips are of substantially the same thickness and rigidity. The inner wall may have the same thickness as each of the lips making up the first pair of lips and may be integrally joined to each of the lips making up the first pair of lips. The inner wall may be comprised of two segments, each of which is integrally joined to one of the lips making up the first pair of lips.

In another aspect, the valve body has an outer periphery at the proximal end of the valve which defines an outer periphery of the valve, and wherein the first, second and third pairs of lips are located within the outer periphery of the valve.

In another aspect, the invention provides a check valve for one-way flow of a fluid, comprising: (a) a proximal end having an inlet opening through which the fluid enters the valve; (b) a distal end having an outlet opening through which the fluid is discharged from the valve when the valve is open, wherein the proximal and distal ends are spaced apart from one another along a central axis of the valve; (c) a valve body formed of a resilient material and extending from the proximal end to the distal end of the valve, wherein the valve body encloses a fluid flow passage extending between the inlet and outlet openings, and wherein the valve body defines at least two pairs of axially-extending sidewalls; (d) a first pair of the sidewalls arranged in opposed facing relation to one another and defining a first pair of resilient lips which are in sealing contact with one another when the valve is closed, with a first slit opening being formed between the first pair of lips, wherein the first slit opening comprises part of the outlet opening; (e) a second pair of the sidewalls arranged in opposed facing relation to one another and defining a second pair of resilient lips which are in sealing contact with one another when the valve is closed, with a second slit opening being formed between the second pair of lips, wherein the second slit opening comprises part of the outlet opening, wherein the first and second pairs of lips are joined together at an angle, and the first and second slit openings intersect one another at an angle. The first and second pairs lips may intersect one another at an angle of about 90 degrees such that the outlet opening defines a T-shape.

BRIEF DESCRIPTION OF THE DRAWINGS

The invention will now be described, by way of example only, with reference to the accompanying drawings in which:

FIG. 2 is a perspective view of the check valve of FIG. 1, shown in isolation;

FIG. 3 is a cross-section along line 3-3 of FIG. 2;

FIG. 6 is a front elevation view of the check valve of FIG. 2;

FIG. 7 is a rear elevation view of the check valve of FIG. 2;

FIG. 8 is a front perspective view of an unflanged check valve according to the invention, installed on the end of a pipe;

FIG. 9 is a rear perspective view of the check valve of FIG. 8, shown in isolation;

FIG. 12 is an exploded rear perspective view of an unflanged pipe with an unflanged check valve according to the invention;

FIG. 13 is a longitudinal cross-section showing the unflanged check valve of FIG. 12 installed inside the pipe of FIG. 12;

FIG. 15 is a graph of flow velocity vs. flow rate;

FIG. 16 is a graph of headloss vs. flow rate;

FIG. 17 is a front perspective view of a check valve according to the invention having a T-shaped outlet opening; and FIG. 18 is a cross-section along line 18-18 of FIG. 17.

DETAILED DESCRIPTION

Figure 1:
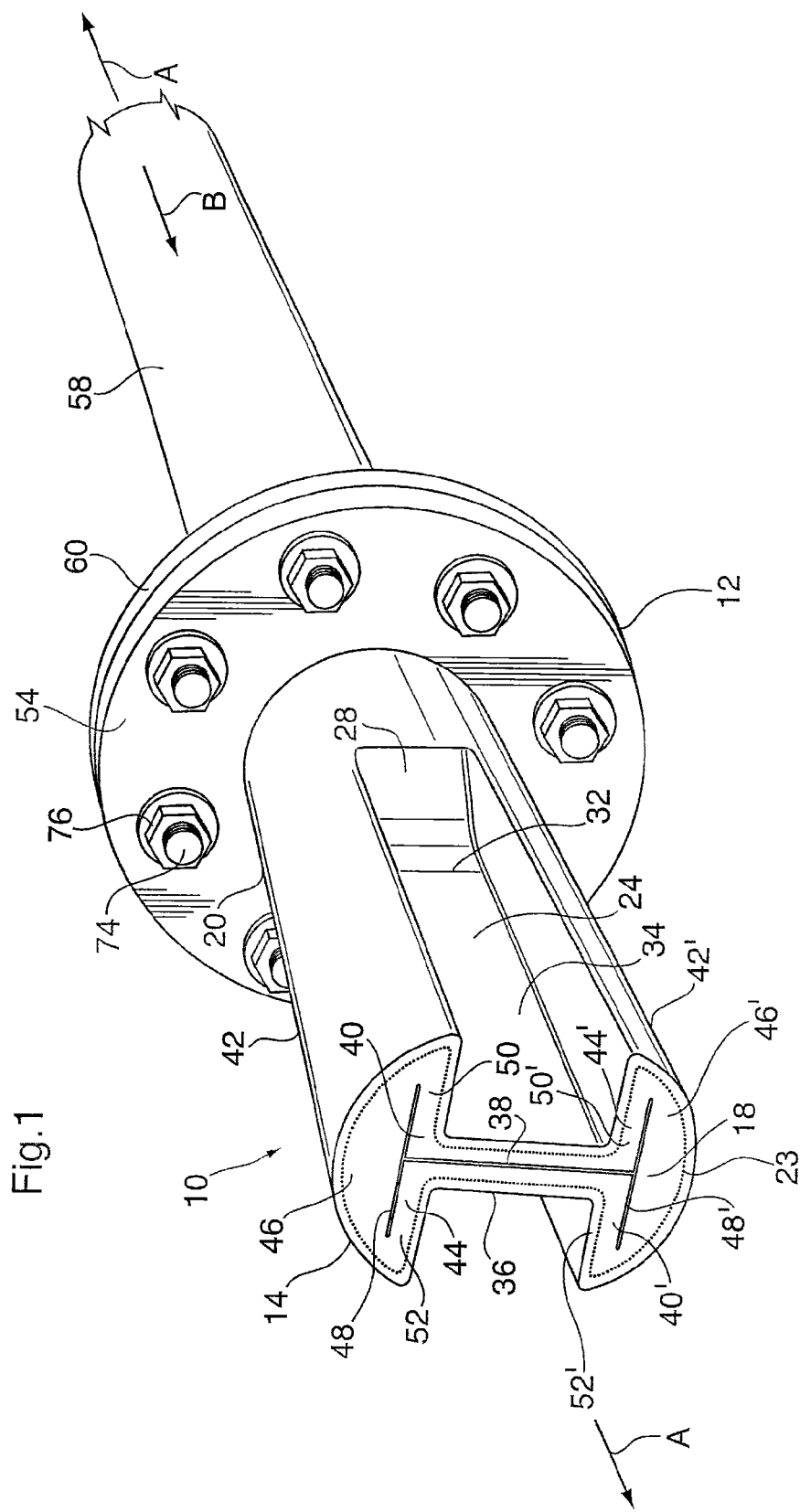
FIG. 1 is a front perspective view of a flanged check valve according to the invention, installed on the end of a pipe.
Figure 4:
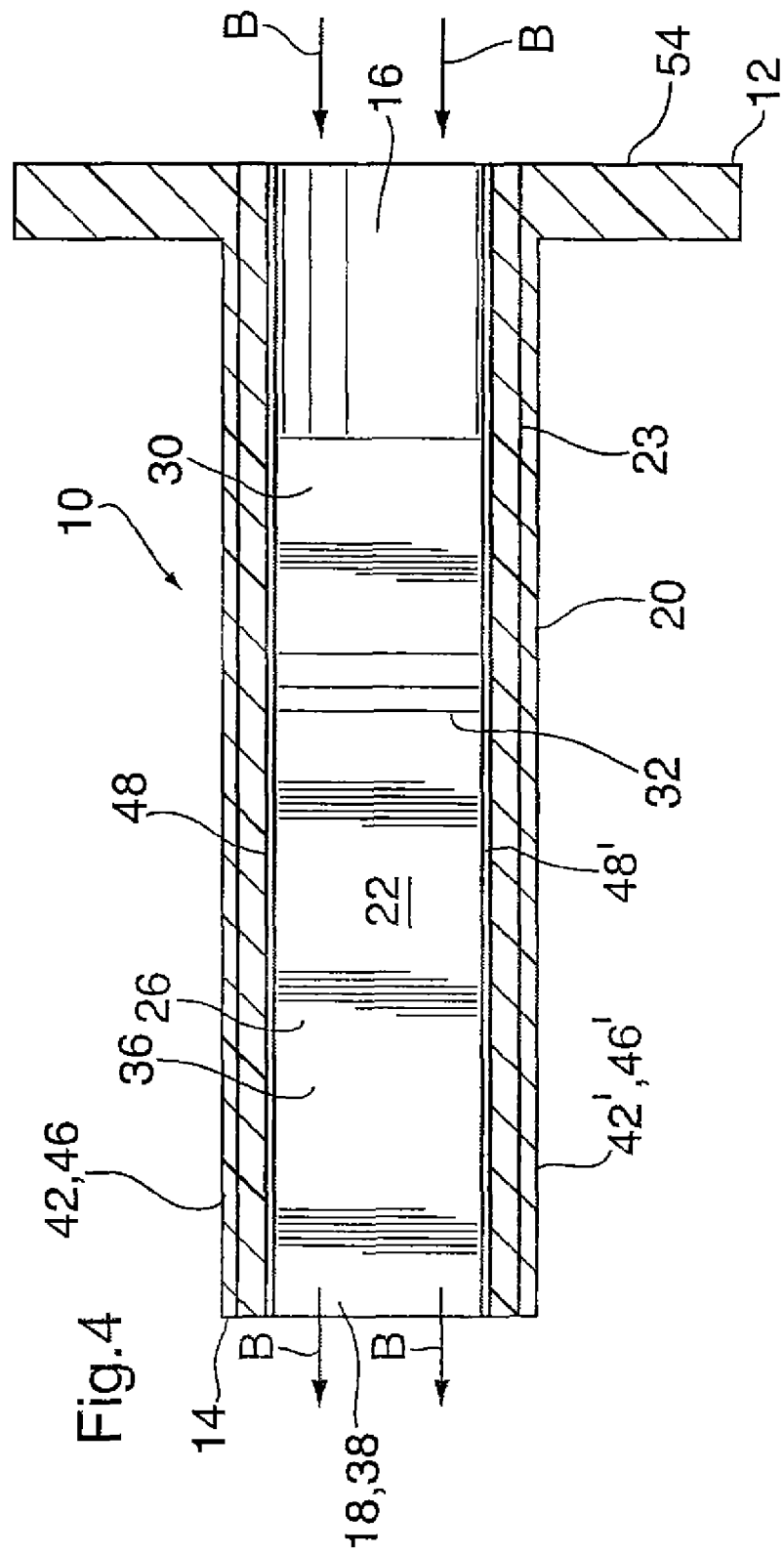
FIG. 4 is a cross-section along line 4-4 of FIG. 2.
Figure 5:
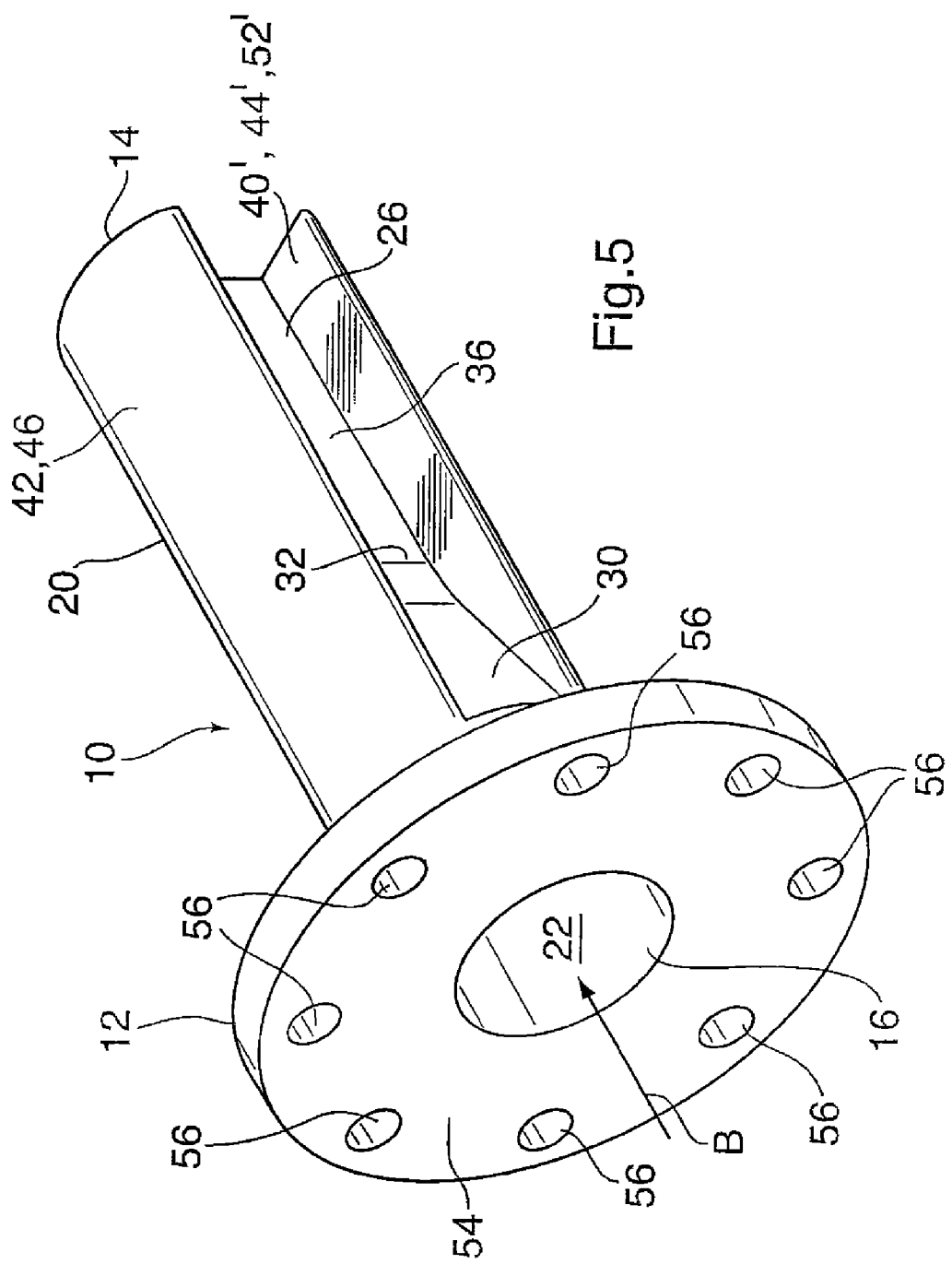
FIG. 5 is a rear perspective view of the check valve of FIG. 2.

The following is a detailed description of specific embodiments of check valves according to the invention.

As used herein, the terms "axial", "longitudinal", and similar terms refer to directions which are parallel to the central valve axis A, which extends centrally through the valve in the direction of fluid flow. The terms "inner", "outer", "inward", "outward" and similar terms refer to directions extending radially toward or away from the central valve axis A in a radial plane which is perpendicular to the central valve axis A.

FIGS. 1 to 7 illustrate a first check valve 10 according to the invention. Check valve 10 has a proximal end 12 and a distal end 14 which are spaced apart along the central valve axis A. The proximal end 12 is provided with an inlet opening 16 (FIG. 5) through which a fluid enters the valve 10 (the direction of flow in the drawings being represented by arrows B) and the distal end 14 has an outlet opening 18 through which the fluid is discharged when valve 10 is open.

Extending between the proximal end 12 and the distal end 14 of the valve 10 is a valve body 20 which is formed of a resilient material and which encloses a fluid flow passage 22 (FIG. 3) extending between the inlet and outlet openings 16, 18. The valve body 20 may have a one-piece construction, and is shaped during the manufacturing process to define three pairs of sidewalls, which are now described in detail below. The construction and thickness of the valve body 20 is at least somewhat dependent on the desired flow characteristics of the valve 10, and also on the diameter of valve 10. Typically, the valve body 10 is constructed of one or more layers of an elastomeric material such as rubber, and may optionally include one or more fibrous reinforcing layers 23.

The valve body 20 includes a first pair of sidewalls 24, 26 which are arranged in opposed facing relation to one another and which extend from the proximal end 12 to the distal end 14 of valve 10. Sidewalls 24, 26 converge toward one another and form a pair of lips which define an outlet slit, and are sometimes referred to herein as "duckbill sidewalls". The sidewalls 24 and 26 may be identical mirror images of one another and may be arranged on opposite sides of the central valve axis A.

The sidewalls 24, 26 include inwardly converging portions 28, 30 which converge radially inwardly toward central axis A and longitudinally in a direction toward the distal end 14 of the valve 10. The inwardly converging portions 28, 30 come together at a point of convergence 32 located between the proximal and distal ends 12, 14 to form a first pair of lips 34, 36. The lips 34, 36 extend from the point of convergence 32 (FIG. 3) of inwardly converging portions 28, 30 to the distal end 14 of valve 10. The duckbill sidewalls 24, 26 and corresponding lips 34, 36 are located entirely within the outer periphery of the valve body 20, i.e. they do not extend radially outwardly of the outer periphery of valve body 20. In the drawings a small gap may be seen between lips 34, 36 and between the second and third pairs of lips described further below. It will be appreciated that these gaps are shown only for the purpose of clearly illustrating the various elements of the valves described herein and that, in practice, there will be no visible gaps between the lips when the valve is completely closed, i.e. the lips will be in direct contact with one another so as to provide a fluid-tight seal.

In check valve 10, the sidewalls 24, 26 begin converging at a point which is spaced from the proximal end 12 of valve 10. It will, however, be appreciated that portions 28, 30 may begin their convergence either at or closer to the proximal end 12 of valve 10.

A first slit opening 38 is defined between lips 34 and 36, and forms part of the outlet opening 18. The first slit opening 38 extends lengthwise throughout the entire height of the lips 34, 36, wherein the height of the lips 34, 36 and the length of first slit opening 38 are measured in a radial plane which is coplanar with the distal end 14 of valve 10. As can be seen from the drawings, both the height of lips 34, 36 and the length of first slit opening 38 are equal to or less than the inside diameter of the valve 10 measured in a radial plane which is coplanar with the proximal end 12 of valve 10. When the valve 10 is closed, the first pair of lips 34, 36 are in contact with one another and the first slit opening 38 is closed with a fluid-tight seal. When the valve 10 is installed on a pipe, the valve 10 is typically oriented with the first slit opening 38 oriented vertically as shown in the drawings. It will, however, be appreciated that first slit opening 38 is not necessarily vertically oriented since at least some of the benefits of the present invention will be realized when the valve 10 is installed with the first slit opening 38 angled relative to the vertical direction. For example, the first slit opening 38 may be oriented horizontally when the valve 10 is installed on a pipe.

The first pair of lips 34, 36 may be flat and planar as shown in the drawings, extending longitudinally from the point of convergence 32 to the distal end 14 of valve 10. Consequently, the first slit opening 38 has the appearance of a straight line at the distal end 14 of valve 10. However, it is not necessary that the first slit opening 38 forms a straight line. Rather, it will be appreciated that the first pair of sidewalls 24, 26 and/or the lips 34, 36 may be curved (when the distal end 14 is viewed from the front as in FIG. 6), such that the first slit opening 38 defines a curved line.

The valve body 20 further includes a second pair of sidewalls and a third pair of sidewalls, which are now described below with reference to the drawings. The second and third pairs of sidewalls of valve 10 may be identical to one another, and therefore only the second pair of sidewalls is described below in detail. The following description of the second pair of sidewalls applies equally to the third pair of sidewalls, and corresponding elements of the second and third pairs of sidewalls are identified by like reference numerals below and in the drawings. The reference numerals relating to elements of the third pair of sidewalls are primed. For example, the second pair of sidewalls are identified by reference numerals 40 and 42, whereas the third pair of sidewalls are identified by reference numerals 40' and 42'.

The second pair of sidewalls 40, 42 of valve body 20 are arranged in opposed facing relation to one another and define a second pair of lips 44, 46 between which a second slit opening 48 is defined. The second slit opening 48 also forms part of the outlet opening 18. Sidewalls 40, 42 are outwardly offset relative to the central valve axis A and are angled relative to the first pair of sidewalls 24, 26 for reasons which will become apparent from the following description.

The second pair of sidewalls 40, 42 of valve 10 are located close to the outer periphery of the valve body 20, with sidewall 42 and its corresponding lip 46 being located radially outwardly of sidewall 40 and its corresponding lip 44. The following description therefore refers to sidewall 40 and lip 44 as the "inner sidewall 40" and the "inner lip 44" respectively, while sidewall 42 and lip 46 are referred to below as the "outer sidewall 42" and the "outer lip 46", respectively.

The outer sidewall 42 is located at the outer periphery of valve body 20, extends continuously from the proximal end 12 to the distal end 14 of valve 10, and is parallel to the central valve axis A along part or all of its axial length. The inner sidewall 40, on the other hand, extends from the point at which the duckbill sidewalls 24, 26 begin to converge to the distal end 14 of valve 10, and is also parallel to the central valve axis A along part of all of its axial length. In valve 10 shown in the drawings, both the inner and outer sidewalls 40, 42 are parallel to the central valve axis A along their entire axial lengths, although it will be appreciated that the sidewalls 40, 42 are not necessarily parallel to axis A. Both the inner and outer sidewalls 40, 42 and corresponding lips 44, 46 are located entirely within the outer periphery of the valve body 20, i.e. they do not extend past the outer periphery of the valve body 20.

The inner and outer lips 44, 46 comprise those portions of sidewalls 40, 42 which are in contact with one another to define the slit opening 48. The second pair of lips 44, 46 extend axially at least from the point of convergence 32 of duckbill sidewalls 24, 26 to the distal end 14 of valve 10. However, it will be appreciated that the second pair of lips 44, 46 may commence at a point which is located between point of convergence 32 and the proximal end 12 of valve 10.

The second pair of lips 44, 46 may be generally flat and planar, at least on the faces which define the second slit opening 48, so as to provide the second slit opening 48 with the appearance of a straight line at the distal end 14 of valve 10. It will be appreciated that the second slit opening 48 may not necessarily have the appearance of a straight line. Rather, the second pair of sidewalls 40, 42 and/or the second pair of lips 44, 46 may be curved such that the second slit opening 48 defines a curved line (when viewed from the front as in FIG. 6).

The second slit opening 48 has a length which is slightly less than the heights of the inner and outer lips 44, 46, due to the fact that the lips 44, 46 are joined together at their ends so as to wrap around and enclose the ends of the second slit opening 48. The heights of lips 44, 46 and the length of the second slit opening are measured in a radial plane which is coplanar with the distal end 14 of valve 10. Because the lips 44, 46 are located close to the outer periphery of valve body 20, and because they are located entirely within the outer periphery of the valve body 20, the heights of lips 44, 46 and the length of the second slit opening 48 are necessarily less than the inside diameter of the valve 10 measured in a radial plane which is coplanar with the proximal end 12 of valve 10. In valve 10 the length of the first slit opening 38 is greater than the length of the second slit opening 48, although this is not necessarily the case. Rather, the second slit opening 48 may be of equal or greater length in comparison to the first slit opening 38. The first, second and third slit openings 38, 48, 48' may have a combined length which is greater than the inside diameter of the valve body 20 at the proximal end 12 of valve 10, and may have a combined length which is equal to or greater than the inside circumference of the valve body 20 at the proximal end 12 of the valve 10. Where the combined lengths of the slit openings 38, 48, 48' is equal to or greater than the inside diameter of the valve body 20, with the valve 10 in its fully open state, the outlet opening 18 will have a greater area than the inlet opening 16, thereby minimizing headloss.

When the valve 10 is closed, the second pair of lips 44, 46 are in contact with one another and the second slit opening 48 is closed with a fluid-tight seal. When the valve 10 is installed on a pipe, the second slit opening 48 is typically oriented horizontally as shown in the drawings. It will, however, be appreciated that the second slit opening 48 is not necessarily horizontally oriented since at least some of the benefits of the present invention will be realized when the valve 10 is installed with the second slit opening 48 angled relative to the horizontal direction. For example, the valve 10 may be installed with the second slit opening 48 oriented vertically.

As shown in the drawings, the first slit opening 38 intersects the second slit opening 48. More specifically, one end of the first slit opening 38 intersects the second slit opening 48 approximately midway between its ends, for example at an angle of about 90°, such that the first slit opening terminates at the second slit opening. Together, the outlet opening 18 comprising the first, second and third slit openings 38, 48, 48' has an overall "I-beam" or "dumbbell" shape, wherein the second pair of sidewalls 40, 42 and corresponding lips 44, 46 are arranged in parallel, spaced relation to the third pair of sidewalls 40', 42' and corresponding lips 44', 46'. Furthermore, the three pairs of lips 34, 36; 44, 46; and 44', 46' are arranged in an overall "I-beam" or "dumbbell" shape at the distal end 14 of valve 10, and may be of substantially constant cross-section throughout their entire length along axis A. More specifically, the second pair of sidewalls 40, 42 and corresponding lips 44, 46 may be mirror images of the third pair of sidewalls 40', 42' and corresponding lips 44', 46', about a longitudinal plane which extends through the central valve axis A and which forms a substantially right angle with the first pair of lips 34, 36. Although the second and third pairs of sidewalls and their corresponding lips are shown as being identical mirror images of one another, this is not necessarily the case. Applications may arise where it may be necessary to vary the shapes or lengths of the second and third sidewalls and their corresponding lips. For example, the second pair of lips 44, 46 can be made shorter than the third pair of lips 44', 46' so as to define a second slit opening 48 which is shorter than the third slit opening 48', for example where the valve 10 is to be installed in a pipe having a non-circular cross-section.

In order to provide an I-beam shaped outlet opening 18, the first pair of lips 34, 36 and the second pair of lips 44, 46 are joined together at an angle of about 90°. More specifically, the inner lip 44 is divided into two segments of substantially equal length; a first segment 50 which is joined to lip 34 of duckbill sidewall 24 and a second segment 52 which is joined to the opposed lip 36 of duckbill sidewall 26 to provide communication between the first and second slit openings 38, 48. The inner lip 44' of the third pair of lips 44', 46' is similarly joined to the opposite ends of duckbill sidewall 24, 26 to provide communication between the first and third slit openings 38, 48'. Again, it is emphasized that the valve body 20 has a one-piece construction and is constructed from a resilient material which is shaped to form the various sidewalls described herein. Therefore, the connections between lip 34 and lip segments 50, 50' and between lip 36 and lip segments 52, 52' are integral connections formed by the shaping of the valve body 20.

The outer sidewall 42 and corresponding outer lip 46 are shown in the drawings as having a greater thickness than inner sidewall 40 and corresponding inner lip 44. This is not necessarily the case. Rather, it is desired that all the sidewalls 24, 26, 40, 42, 40' and 42', and particularly the lips 34, 36, 44, 46, 44' and 46' are of either the same or substantially the same thickness and flexibility.

In use, the valve according to the invention may be installed either inside or projecting from the end of a fluid-carrying pipe. Depending on the desired installation method and the configuration of the pipe, the proximal end 12 of the valve may be provided with various connection means. For example, valve 10 is shown as having a radially projecting flange 54 at the proximal end 12 of valve 10, the flange 54 having a plurality of bolt holes 56 (FIG. 2). Valve 10 is therefore suited for installation either inside or projecting from the end of a pipe 58 having at least one end provided with a radially projecting flange 60 provided with a plurality of bolt holes (not visible in FIG. 1). The flange 54 of valve 10 is bolted to flange 60 of pipe 58 by bolts 74 and nuts 76 and, depending on whether valve 10 is installed inside or outside of pipe 58, either the proximal or distal surface of valve flange 58 will mate with the pipe flange 60. In the valve 10 shown in FIG. 1, the proximal (end) surface of flange 54 mates with the end surface of the pipe flange 60.

Where the valve 10 is installed outside the pipe 58, as shown in FIG. 1, the maximum inside diameter of the valve body 20 (measured at the proximal end 12 of valve 10) may be either the same as or slightly greater than the inside diameter of the pipe 58.

Valve 10 has been described above as having sidewalls 24, 26, 40, 42 and corresponding lips 34, 36, 44, 46 which are located entirely within the outer periphery of the valve body 20. While this may help to provide the valve 10 with a compact shape and permit it to fit within a pipe, it will be appreciated that the duckbill sidewalls and corresponding lips are not necessarily located within the outer periphery of the valve body 20 in all embodiments of the invention, particularly where the valve 10 is to be mounted on the outside of a pipe as in FIG. 1. For example, the sidewalls 24, 26, 40, 42 and corresponding lips 34, 36, 44, 46 may be flared so as to taper outwardly in a radial direction toward the distal end of the valve 10, such that the sidewalls and lips project outwardly of the outer periphery of the valve body 20 at the distal end of valve 10. The flaring of the sidewalls and lips has the effect of increasing the lengths of the outlet slit openings 38, 48.

The valve according to the invention may also be installed on the end of a pipe 64 which does not have a radially extending flange, and this configuration is shown in connection with valve 110 illustrated in FIGS. 8 and 9. The valve 110 is identical to valve 10, except as noted below, and therefore the same reference numerals are used to describe corresponding elements of valves 10 and 110, and the above description of the elements of valve 10 applies equally to the commonly numbered elements of valve 110.

One difference between valves 10 and 110 is that valve 110 lacks a flange 54, and is therefore better suited to mounting on flangeless pipe 64 than valve 10. Valve 110 is installed on pipe 64 by sliding the proximal end 16 of valve 110 over the end of the pipe 64 and securing the valve 110 by an annular clamp 65 which encircles the outer periphery of the valve body 20, close to the proximal end 16 of valve 110 at which the valve 110 and pipe 64 overlap. In this configuration, the valve 110 has an inside diameter, measured at its proximal end 12, which is slightly greater than the outside diameter of the pipe 64 so as to be closely received over the end of pipe 64. Also, in the flangeless valve 110 the sidewalls 24, 26 begin their convergence at a point 33 which is spaced from the proximal end 12. Therefore, the valve body 20 has a regular cylindrical profile from proximal end 12 to point 33 so as to form a cylindrical cuff 66 for overlapping and clamping to the end of pipe 64.

Valves according to the invention may also be installed inside pipes, and this mounting method is now discussed below in connection with FIGS. 10-13.

Figure 10:
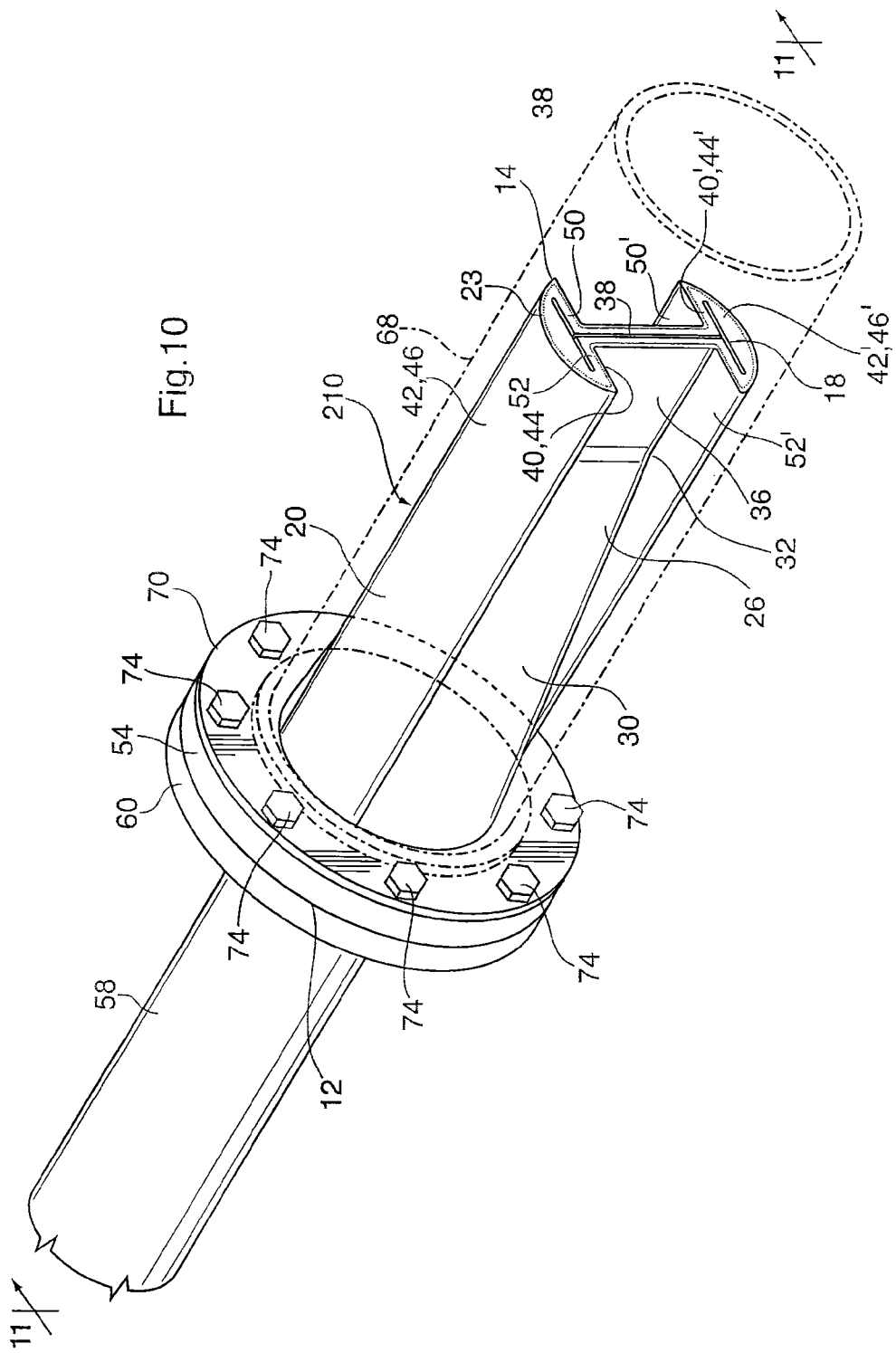
FIG. 10 is a front perspective view of a flanged check valve according to the invention, installed inside a pipe.
Figure 11:
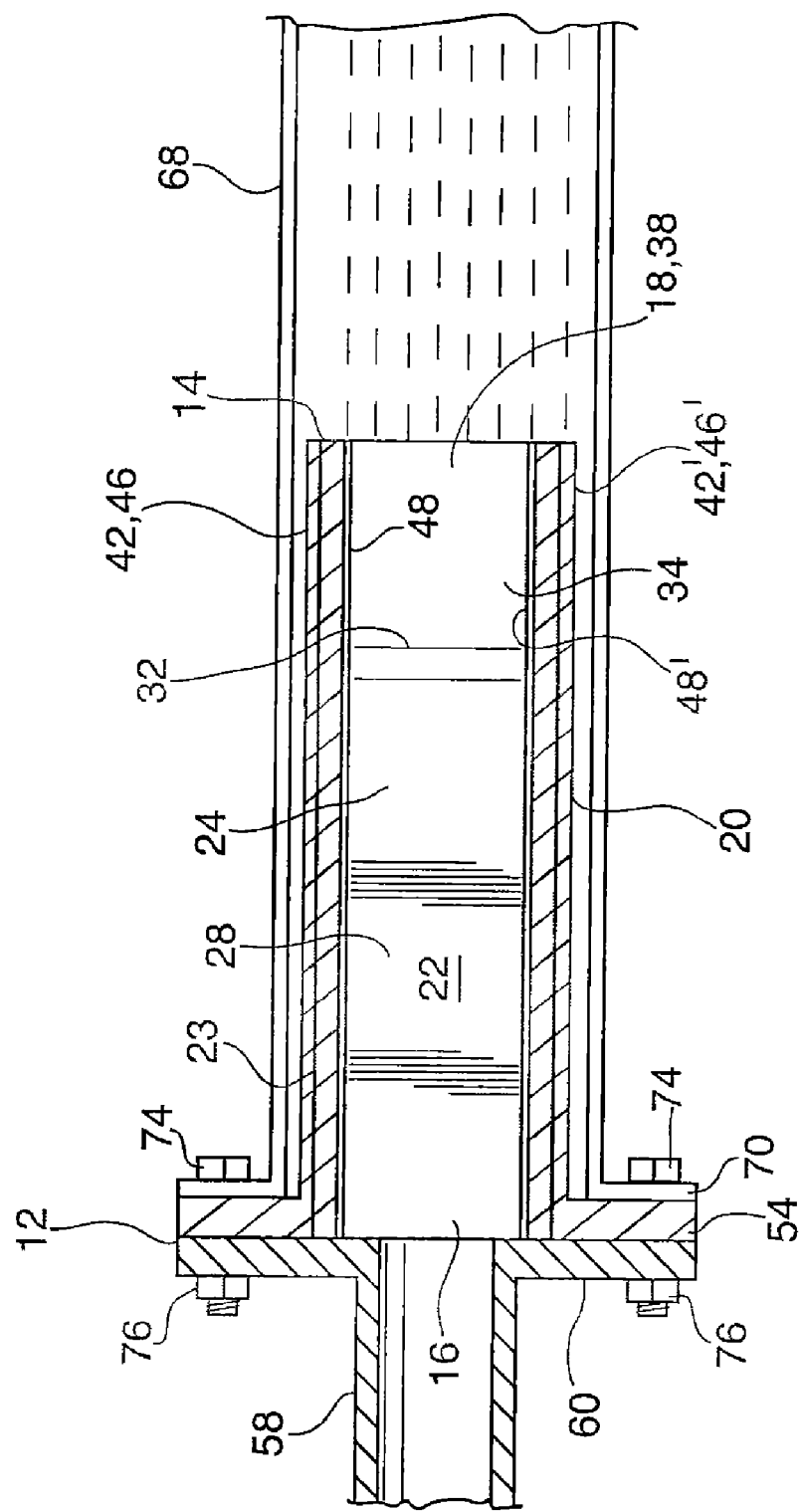
FIG. 11 is a cross-section along line 11-11 of FIG. 10.

FIGS. 10 and 11 show a flanged valve 210 installed inside a flanged pipe 68. Valve 210 is identical to valve 10, except as noted below, and therefore the same reference numerals are used to describe corresponding elements of valves 10 and 210, and the above description of the elements of valve 10 applies equally to the commonly numbered elements of valve 210.

Valve 210 is installed at a joint between two lengths of pipe 58 and 68. Pipe 58 has a flange 60 with bolt holes (not visible in FIGS. 10-11), and pipe 68 has a flange 70 with bolt holes (not visible in FIGS. 10-11). The flange 54 of valve 210 is sealingly clamped between flanges 60, 70 of the respective pipes 58, 68, with the distal surface of flange 54 engaging the flange 70 of pipe 68 and the proximal surface of flange 54 engaging the flange 60 of pipe 58. The bolt holes 56 (not shown) of valve flange 54 align with the bolt holes of pipe flanges 60, 70, and bolts 74 are received in the aligned bolt holes and secured with nuts 76 (FIG. 11) in order to secure the respective flanges 54, 60, 70 together with a fluid tight seal.

The valve body 20 of valve 210 extends into the pipe 68. As will be appreciated, the maximum outside diameter of the valve body 20 (measured at the proximal end 12 of valve 10) is necessarily smaller than the inside diameter of pipe 68, and the difference between the maximum outside diameter of valve body 20 and the inside diameter of pipe 68 is slight, so that the valve body 20 will be closely received inside the pipe 68. As shown in FIG. 11, the valve body 20 of valve 210 is entirely self-supporting and the second and third pairs of lips are substantially constantly spaced from the inner surface of pipe 68 throughout substantially their entire axial length.

It may be seen that the converging portions 28, 30 of sidewalls 24, 26 in valve 210 are axially longer than the corresponding converging portions 28, 30 of valve 10. This difference is not material to the function of valves 10, 210, and is merely the result of different tooling being used to manufacture valves 10, 210. This difference in the length of converging portions has been shown only to indicate that the appearance of the valves according to the invention can vary without affecting their operation, and it will be appreciated that valve 10 is equally well suited for installation inside pipe 68.

FIGS. 12 and 13 show an unflanged valve 310 installed inside an unflanged pipe 64. Valve 310 is identical to valve 110 shown in FIGS. 8 and 9, with the possible exception of its diameter relative to that of pipe 64. Therefore, the same reference numerals are used to describe corresponding elements of valves 10, 110 and 310, and the above description of the elements of valve 10 applies equally to the commonly numbered elements of valve 310. Valve 310 is installed by sliding it into the end of pipe 64. In this configuration, the valve 310 has an outside diameter, throughout its entire axial length, which is slightly less than the inside diameter of the pipe 64 so as to be closely received inside pipe 64.

Valve 310 is secured inside pipe 64 by an expanding annular clamp 67 which fits inside cuff 66 of the valve body 20, close to the proximal end 16 of valve 110. The clamp 67 is expanded radially as indicated by arrows C (FIG. 13) to form a secure, fluid-tight seal between the valve 310 and the inside surface of pipe 64. Although valve 310 is shown as having a constant diameter, or height, throughout its axial length, it will be appreciated that the valve body 20 may taper in diameter toward the distal end 14 so as to provide a gap between the valve body and the inside surface of pipe 64, at least near the distal end 14.

The valves according to the invention are designed to permit fluid flow in one direction only, i.e. from the inlet opening 16 to outlet opening 18, and to remain closed where the backpressure in an application exceeds the inlet pressure. Furthermore, the valve must be able to resist "inversion", which can occur under conditions of high backpressure.

In terms of flow performance, the valves according to the invention are designed to have a low resistance to the flow of fluid in the desired direction, opening at a low positive inlet pressure and progressively opening to a greater degree as the inlet pressure increases. The maximum area to which the outlet opening 18 can open may be equal to or greater than the area of the inlet opening 16, which has the effect of reducing flow velocity in the pipe and reducing headloss or pressure drop across the valve.

Figure 14:
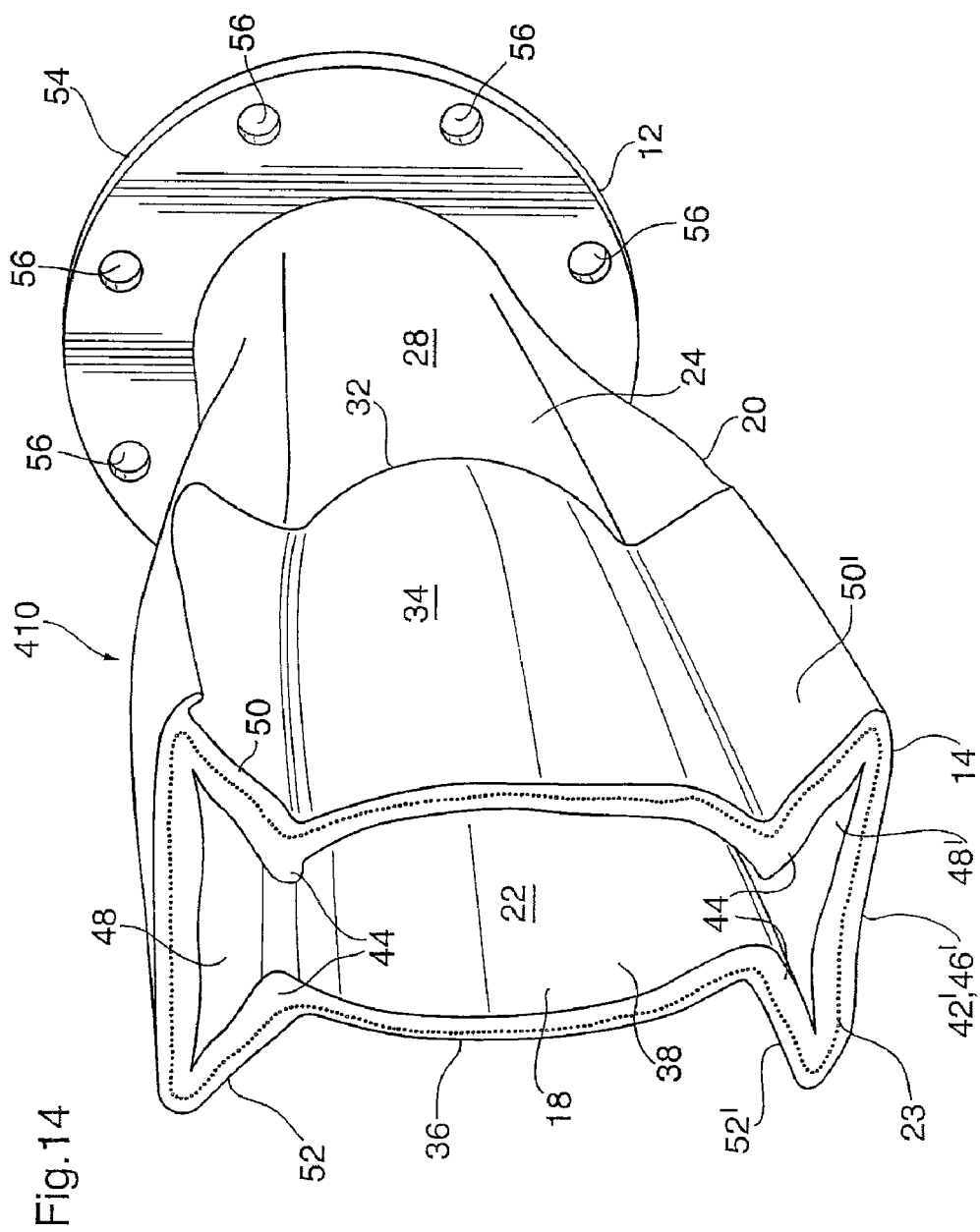
FIG. 14 is a front perspective view of a flanged check valve according to the invention in the open configuration.

FIG. 14 illustrates a valve 410 which is in a partially open state, to show the appearance of a valve according to the invention under high flow conditions. Valve 410 is identical to valve 10, except as noted below, and therefore the same reference numerals are used to describe corresponding elements of valves 10 and 410, and the above description of the elements of valve 10 applies equally to the commonly numbered elements of valve 410. Under conditions where fluid is flowing through the valve 410, the three pairs of lips 34, 36; 44, 46; 44', 46' will bulge out and become spread apart by the pressure of the fluid, progressively opening from the closed configuration of FIG. 1 to the partially open configuration shown in FIG. 14. It will be seen that all three pairs of lips will open or unfold, with the greatest amount of opening being at the middle of each slit opening. It can also be seen that the overall height of the outlet opening 18 may increase due to the opening of the second and third pairs of lips 44, 46; 44', 46'. Theoretically, the valve 410 can be opened to the point that the outlet opening 18 has an approximately circular shape and, due to the unfolding of the second and third pairs of lips, outlet opening 18 would then have a diameter and an open area which are greater than the inside diameter and the open area of the inlet opening 16. In practice, however, the flow rate of the fluid through valve 410 will rarely reach a level which is sufficient high to completely open the valve 410 to its maximum degree, and FIG. 14 represents an approximate maximum opening configuration under normal conditions of use. The open area of outlet opening 18 as shown in FIG. 14 is close to that of inlet opening 16 and is sufficient to ensure a low pressure drop across the valve 410.

Valve 410 has a slightly different configuration than valve 10 described above, in that the outer sidewalls 42, 42' and corresponding lips 46, 46' are substantially flat, whereas the corresponding outer sidewalls and lips of valve 10 are shown as having an outer curved surface which may conform to the curvature of a pipe on which the valve 10 is installed. This curvature is not necessary, nor is it material to the function of valve 10. Rather, difference in appearance of the outer sidewalls and lips in valves 10 and 410 is merely the result of different tooling being used to manufacture the valves 10 and 410.

It has been confirmed by testing that the valves according to the invention have improved flow performance and resistance to backpressure as compared to conventional duckbill check valves. These tests are now described below.

The tests were conducted using a check valve similar in appearance to valve 10 described above, having a valve body with three pairs of sidewalls which together define an I-beam shape at the distal end thereof. For purposes of comparison, a conventional duckbill check valve was also tested, the conventional valve having a single slit opening formed by a single pair of duckbill sidewalls having a height and an outlet slit length approximately the same as the inside diameter of the valve. Both the I-beam check valve and the conventional check valve had an inside diameter of 3 inches. Each valve was mounted to the end of a pipe and tested under a wide range of flow rates, ranging from 0 liters/second (l/s) to about 60 l/s. Flow velocity and headloss (pressure drop) were measured under the range of flow rates, and the test results for both the valve according to the invention ("I-Beam") and the prior art valve ("Conventional") are illustrated in FIGS. 15 and 16.

As can be seen from FIG. 15, a graph of velocity vs. flow rate, the check valve according to the invention produces lower flow velocities than the conventional duckbill check valve over almost the entire range of flow rates. Lower flow velocities are desired in order to minimize wear-related damage to the interior of the pipe. The sharp increase in flow velocity at 0.25 l/s is caused by the initial opening of the valve.

As can be seen from FIG. 16, a graph of headloss vs. flow rate, the check valve according to the invention produces a lower pressure drop than the conventional duckbill check valve over almost the entire range of flow rates. The headloss or pressure drop is the difference in the fluid pressure upstream from the inlet and the fluid pressure downstream from the outlet. It is desirable that the headloss is minimized. The sharp increase in headloss at 0.25 l/s is caused by the initial opening of the valve.

The valve according to the invention was also tested for resistance to inversion, up to a maximum back pressure of 150 psi., which is greater than back pressures which would be encountered in most applications. The valve did not undergo inversion at 150 psi back pressure.

The inventors have found that the use of three pairs of sidewalls and lips arranged in an I-beam or dumbbell shape provides the valves according to the invention with enhanced rigidity along the axial direction, such that the valves according to the invention are capable of supporting their own weight throughout their entire length, without sagging, and without the use of curved lips or rigid or semi-rigid reinforcement members such as metal rods to provide support and keep them closed. Furthermore, the I-beam or dumbbell shape helps to prevent the duckbill sidewalls from collapsing and inverting under backpressure, thereby providing the valves according to the invention with improved inversion resistance, again without the need for additional reinforcement in the lips or the saddle (converging) portions of the valve. In fact, the sidewalls of the valves according to the present invention may desirably have the same thickness and layer construction throughout their entire lengths, including the lips portions. This makes for a simpler, more economical construction and one which has wide applicability in different applications. The inventors have further found that these benefits of the I-beam or dumbbell shape are realized over a wide range of valve diameters, and whether the valves are installed inside or outside a fluid-carrying pipe. Therefore, it is expected that the check valves according to the invention can be used over a wider range of applications than the prior art check valves mentioned herein.

Although valves in accordance with the invention may be provided with three pairs of sidewalls so as to define an overall "I-beam" shape at the distal end and at the outlet opening, it will be appreciated that at least some of the benefits of the invention may be realized by providing the valve with only two pairs of sidewalls and two corresponding pairs of sealing lips. FIGS. 17 and 18 show a valve 510 which is identical to valve 10, except as noted below, and therefore the same reference numerals are used to describe corresponding elements of valves 10 and 510, and the above description of the elements of valve 10 applies equally to the commonly numbered elements of valve 510. As can be seen from a comparison of FIGS. 1 and 17, valve 510 differs from valve 10 in that it includes only a first pair of duckbill sidewalls 24, 26 with lips 34, 36 and a second pair of sidewalls 40, 42 with lips 44, 46, such that the outlet opening 18 of valve 510 has a "T-shape" comprised of a first slit opening 38 and a second slit opening 48. Valve 510 can be used in a variety of applications, including applications where the valve 510 is installed in a pipe having a non-circular cross-section. For example, the valve 510 is suited for use inside pipes having an ovoid cross-section, with the sidewalls 40, 42 received in the wider portion of the ovoid shape.

While the invention has been described in connection with certain specific embodiments, it is not limited thereto. Rather, the invention includes all embodiments which may fall within the scope of the following claims.

What is claimed is:

1. A check valve for one-way flow of a fluid, comprising:
   (a) a proximal end having an inlet opening through which the fluid enters the valve;
   (b) a distal end having an outlet opening through which the fluid is discharged from the valve when the valve is open, wherein the proximal and distal ends are spaced apart from one another along a central axis of the valve;
   (c) a valve body formed of a resilient material and extending from the proximal end to the distal end of the valve, wherein the valve body encloses a fluid flow passage extending between the inlet and outlet openings, and wherein the valve body defines three pairs of axially-extending sidewalls;
   (d) a first pair of the sidewalls arranged in opposed facing relation to one another and defining a first pair of resilient lips which are in sealing contact with one another when the valve is closed, with a first slit opening being formed between the first pair of lips, wherein the first slit opening comprises part of the outlet opening;
   (e) a second pair of the sidewalls arranged in opposed facing relation to one another and defining a second pair of resilient lips which are in sealing contact with one another when the valve is closed, with a second slit opening being formed between the second pair of lips, wherein the second slit opening comprises part of the outlet opening;
   (f) a third pair of the sidewalls arranged in opposed facing relation to one another and defining a third pair of resilient lips which are in sealing contact with one another when the valve is closed, with a third slit opening being formed between the third pair of lips, wherein the third slit opening comprises part of the outlet opening;
   wherein the second pair of lips is joined to the first pair of lips at an angle, and the first and second slit openings intersect one another at an angle;
   wherein the third pair of lips is joined to the first pair of lips at an angle, and the first and third slit openings intersect one another at an angle; and
   wherein the angle between the first and second pair of lips is about 90 degrees, and the angle between the first and third pair of lips is about 90 degrees.

2. A check valve according to claim 1, wherein the first slit opening has a pair of opposed ends, and wherein the ends of the first slit opening intersect the second and third slit opening approximately midway between their ends, such that the outlet opening defined by the first, second and third slit openings has an I-beam cross-sectional shape.

3. The check valve according to claim 1, wherein the first, second and third slit openings have a combined length which is greater than an inside diameter of the valve body at the proximal end of the valve.

4. The check valve according to claim 1, wherein the first, second and third slit openings have a combined length which is equal to or greater than an inside circumference of the valve body at the proximal end of the valve.

5. The check valve according to claim 1, wherein the first pair of sidewalls include inwardly converging portions which converge radially inwardly toward the central axis and axially toward the distal end of the valve, and wherein the converging portions come together at a point of convergence located between the proximal and distal ends of the valve.

6. The check valve according to claim 5, wherein the first pair of lips and the first slit opening extend along the central axis from the point of convergence to the distal end of the valve.

7. The check valve according to claim 5, wherein the second and third pairs of lips and the second and third slit openings extend parallel to the central axis from the point of convergence to the distal end of the valve.

8. The check valve according to claim 1, wherein the first pair of sidewalls comprises a pair of duckbill sidewalls.

9. The check valve according to claim 1, wherein the first pair of lips are arranged symmetrically about the central axis, and wherein the first and second pairs of lips are offset from the central axis.

10. The check valve according to claim 9, wherein the second and third pairs of lips are arranged parallel to one another and symmetrically about the central axis, with the first pair of lips extending lengthwise between the second and third pairs of lips.

11. The check valve according to claim 1, wherein the second and third pairs of walls each include an inner sidewall and an outer sidewall.

12. The check valve according to claim 11, wherein the outer sidewall has an outer surface located at an outer periphery of the valve body.

13. The check valve according to claim 11, wherein the outer sidewall extends parallel to the central axis from the proximal end to the distal end of the valve.

14. The check valve according to claim 11, wherein the first, second and third pairs of lips are of substantially the same thickness and rigidity.

15. The check valve according to claim 11, wherein the inner wall has the same thickness as each of the lips making up the first pair of lips and is integrally joined to each of the lips making up the first pair of lips.

16. The check valve according to claim 15, wherein the inner wall is comprised of two segments, each of which is integrally joined to one of the lips making up the first pair of lips.

17. The check valve according to claim 1, wherein the valve body has an outer periphery at the proximal end of the valve which defines an outer periphery of the valve, and wherein the first, second and third pairs of lips are located within the outer periphery of the valve.

18. A check valve for one-way flow of a fluid, comprising:
(a) a proximal end having an inlet opening through which the fluid enters the valve;
(b) a distal end having an outlet opening through which the fluid is discharged from the valve when the valve is open, wherein the proximal and distal ends are spaced apart from one another along a central axis of the valve;
(c) a valve body formed of a resilient material and extending from the proximal end to the distal end of the valve, wherein the valve body encloses a fluid flow passage extending between the inlet and outlet openings, and wherein the valve body defines at least two pairs of axially-extending sidewalls;
(d) a first pair of the sidewalls arranged in opposed facing relation to one another and defining a first pair of resilient lips which are in sealing contact with one another when the valve is closed, with a first slit opening being formed between the first pair of lips, wherein the first slit opening comprises part of the outlet opening;
(e) a second pair of the sidewalls arranged in opposed facing relation to one another and defining a second pair of resilient lips which are in sealing contact with one another when the valve is closed, with a second slit opening being formed between the second pair of lips, wherein the second slit opening comprises part of the outlet opening, wherein the first and second pairs of lips are joined together at an angle, and the first and second slit openings intersect one another at an angle; and
wherein the first and second pairs of lips intersect one another at an angle of about 90 degrees such that the outlet opening defines a T-shape.

* * * * *